United States Patent [19]
Marx

[11] 3,994,588
[45] Nov. 30, 1976

[54] DETECTION OF ANGULAR DEFLECTION

[75] Inventor: Wolf Rüdiger Marx, Bad Vilbel-Gronau, Germany

[73] Assignee: Hartmann & Braun Aktiengesellschaft, Frankfurt am Main, Germany

[22] Filed: Mar. 24, 1975

[21] Appl. No.: 561,476

[30] Foreign Application Priority Data
Mar. 27, 1974  Germany...................... 7410609[U]

[52] U.S. Cl. .................................. 356/152; 73/1 E; 250/230; 250/239; 324/97
[51] Int. Cl.² ..................... G01B 11/26; G01D 5/30
[58] Field of Search ............ 356/152, 153; 250/230, 250/239; 324/36, 97; 73/1 E, 26, 27.4

[56] References Cited
UNITED STATES PATENTS

| | | |
|---|---|---|
| 2,640,866 | 6/1953 | Powell .................................. 250/230 |
| 3,026,472 | 3/1962 | Greene et al. ........................ 324/36 |
| 3,395,287 | 7/1968 | Rajac .................................. 250/230 |
| 3,486,826 | 12/1969 | Colvin et al. ........................ 356/152 |
| 3,533,699 | 10/1970 | Hopkins et al. ..................... 356/152 |

*Primary Examiner*—Richard A. Farley
*Assistant Examiner*—S.C. Buczinski
*Attorney, Agent, or Firm*—Ralf H. Siegemund

[57] ABSTRACT

A mirror is mounted on a torsion fiber and at right angles to the axis of a light emitting semi-conductor (diode) with front lens. Two silicon photo-detectors are symmetrically positioned to the axis, right next to the lens, but in spaced apart relation for leaving a gap between them through which passes the light. Detectors and diode are mounted in a metal block.

2 Claims, 1 Drawing Figure

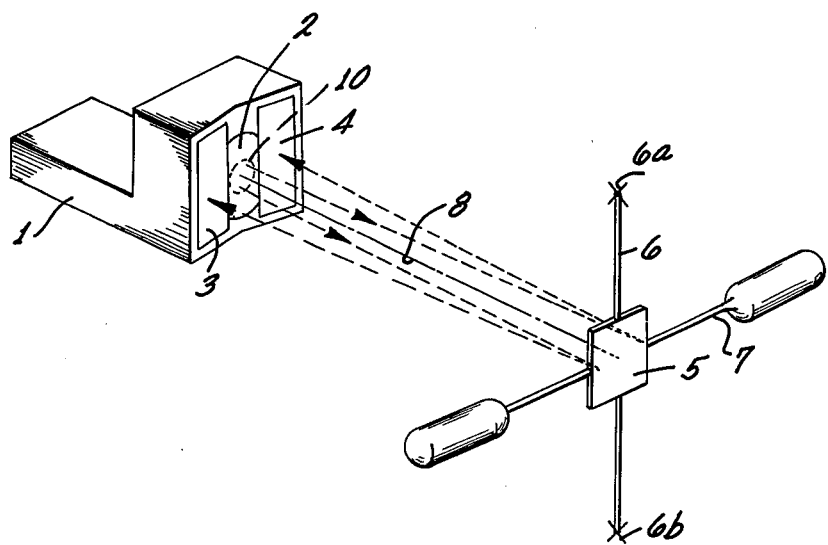

3,994,588

DETECTION OF ANGULAR DEFLECTION

BACKGROUND OF THE INVENTION

The present invention relates to detection of rotation or angular deflection of a suspended object being connected with a reflector which turns with the object.

The detection of a deflection is used, for example, in torque measuring instruments. The U.S. Pat. No. 3,026,472, for example, describes a null type gas analyzer which has a very high sensitivity. The object being suspended by a torsion fiber in a dumbbell which experiences very small torque in magnetic fields and twists the fiber slightly. A reflector is affixed to the fiber, and light from a source is deflected in a direction that varies with any change in position of the reflector. A beam splitter divides the reflected beam in two portions which vary in intensity in opposite directions upon deflection of the reflector. Two photoelectric detectors respond to the two beams and a circuit forms a difference or error signal which is used to control electrically the torque exerted on the suspended object so as to restore the deflection to a null position in which the two beams balance. The control current needed to maintain that balance is a measure of the torque which tended to deflect the object.

The principles employed here are quite satisfactory. However, the construction is rather complicated and, therefore, readily amenable to interference requiring readjustment etc. Most particularly, the optical path (actually a dual path) is rather elaborately defined which complicates construction, adjustment positioning, handling, use, and maintenance.

DESCRIPTION OF THE INVENTION

It is an object of the present invention to improve on instruments of the type in which a reflector turns, for example, with a fiber which is subjected to torsional twisting. The construction must be simple, and particularly the elements defining the optical paths must be simplified. Moreover, the equipment should be miniaturized to match the sizes of components with the dimensions of the, usually rather small (and light) reflector. Also, the energy requirement for the light source needed should be very low. The light source should not develop too much heat as that may influence the deflection system and change its characteristics.

In accordance with the preferred embodiment of the present invention, it is suggested to use a radiation emitting semi-conductor, e.g. a diode with a front lens directing a beam towards a deflecting reflector, so that in a null position thereof the optical axis of the incident beam is at right angles. Photo detectors are positioned right at the lens and symmetrically thereto to intercept the slightly divergent, reflected beam at two locations which are symmetrical to the optical axis, so that equal amounts of light are received by the two cells, when the reflector has the null position.

The cells and the light emitting diode are preferably mounted in a heat dissipating metal block, whereby the detectors have planes of sensitivity which are inclined by slightly less than 90° to the optical axis.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

the FIGURE is a perspective view of an example of the preferred embodiment of the invention.

Proceeding now to the detailed description of the drawings, reference numeral 6 refers to a torsion fiber suitably suspended at its ends at points 6a and 6b pertaining to a frame, casing or the like. The torsion fiber carriers a dumbbell system 7, which may be of the type shown also in the above mentioned patent. Other possibilities, uses and constructions are shown, for example, in U.S. Pat. Nos. 3,742,344 and 3,815,018.

The torsion fiber 6 carries a rectangular reflector 5 being oriented in a particular plane for null or zero torsion and deflection of fiber 6. The light source and receiver equipment is positioned straight in front of that mirror. This equipment is of particular compact design.

A small aluminum, block-like casing or housing 1 has a central bore in which has been mounted an infrared emitting diode 10. A lens 2 which provides a near-collimated beam is disposed in front of the diode. Two silicon photo-elements 3 and 3 of flat rectangular construction are mounted onto block 1 in such a manner that each covers a portion of the lens 2. Hence, light will actually be emitted only through the vertical gap between elements 3 and 4. These elements have, of course, their light sensitive surface oriented away from the housing 1, so that the light they block and intercept does not influence their electrical outputs.

The beam as emitted through lens 2 is slightly divergent but runs along the optical axis 8. The two detectors 3 and 4 are symmetrically disposed to that axis with a slight inclination towards it; in other words, the planes of sensitivity of these detectors 3 and 4 are not coplanar, but slightly inclined to each other, and each is inclined by a little less (a few degrees) than 90° to axis 8.

The light emitted through the gap between the photo detectors is intercepted by the reflector 5, which reflects it back. The axis 8 should (always) intercept the center of that mirror and should also intercept the torsion axis of fiber 6 at right angles. Due to slight divergence of the beam, the reflected light does not merely return on the same path, but spreads slightly, so that a portion reaches each of the cells 3 and 5. For proper adjustment these light portions will be equal whereby one can readily see that source and detectors are adjusted in unison; their spatial relation remains the same. It is merely necessary to adjust the optical axis 8 to intercept the center of mirror 5 at right angles to the mirror plane when in the null position. The detectors are oriented therewith and any further adjustment that may be needed can be carried out by means of, for example, trimming resistors in the electrical circuit to which the detectors 3 and 4 pertain.

The light emitting diode has very low power requirements while the metal block 1 serves readily as heat dissipator. Hence, the torsion system is not influenced by that illuminating system, even if the distance is small. That distance (reflector-to-lens) is preferably about 10 to 30 mm, so that the device has rather modes space requirements.

Using an infrared diode together with infrared sensitive silicon photo-elements optimizes yield on the basis of the sensitivity spectrum of the diodes. Particularly, ambient light (e.g. sunlight) will not interfere. It can readily be seen that one does not need additional optical elements, such as beam splitters, etc.; just one lens (or optic) in front of the diode and, of course, the mirror 5.

The detectors 3 and 4 may be connected to an electrical circuit of conventional design in which the signals they produce are compared with each other; an error signal is formed and operates e.g. an automatic control circuit which influences in some fashion the torque that acts on the fiber 6, so as to null the instrument. The current or voltage in the control circuit needed to null the instrument is then used to indicate the torque that acted on the fiber and which was balanced by operation of the circuit.

The invention is not limited to the embodiments described above, but all changes and modifications thereof not constituting departures from the spirit and scope of the invention are intended to be included.

I claim:

1. In an instrument for measuring rotational or angular deflections, such as resulting from torsion and/or torque, there being a reflector which follows that deflection, the improvement comprising:
   a light emitting semi-conductor element; a lens disposed in front of said element for orienting a beam of radiation towards the reflection, whereby the optical axis of the beam and the lens are at right angles for a particular position of the reflector;
   a pair of flat detectors positioned next to the lens, and symmetrically to the axis, the detectors being mounted in spaced apart relation to each other partially covering the lens but leaving a gap for restricting the width of the beam permitted to pass between them; and
   the element, the detectors, and the lens being mounted to a common casing.

2. In an instrument as in claim 1, wherein each of the detectors has a flat sensitive surface and being inclined to said axis by slightly less than 90°.

* * * * *